(12) United States Patent
Khalili et al.

(10) Patent No.: US 11,435,145 B2
(45) Date of Patent: Sep. 6, 2022

(54) THERMAL ENERGY STORAGE SYSTEM WITH NUCLEATION COOLING

(71) Applicant: ROCKY RESEARCH, Boulder City, NV (US)

(72) Inventors: Kaveh Khalili, Boulder City, NV (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 31 days.

(21) Appl. No.: 16/940,864

(22) Filed: Jul. 28, 2020

(65) Prior Publication Data

US 2022/0034601 A1 Feb. 3, 2022

(51) Int. Cl.
*F28D 17/00* (2006.01)
*F28D 19/00* (2006.01)
*F28D 20/02* (2006.01)

(52) U.S. Cl.
CPC ................. *F28D 20/02* (2013.01)

(58) Field of Classification Search
CPC ....................................................... F28D 20/02
USPC .......................................................... 165/10
See application file for complete search history.

(56) References Cited

U.S. PATENT DOCUMENTS

| | | | |
|---|---|---|---|
| 4,367,634 A | 1/1983 | Bolton | |
| 4,519,441 A | 5/1985 | Spevack | |
| 2006/0247463 A1 | 11/2006 | Rangachari et al. | |
| 2011/0265506 A1 | 11/2011 | Alston | |
| 2012/0018116 A1* | 1/2012 | Mathur | B65B 29/00 165/10 |
| 2012/0263980 A1 | 10/2012 | Soukhojak et al. | |
| 2014/0102662 A1 | 4/2014 | Grama et al. | |
| 2015/0292775 A1 | 10/2015 | Ma et al. | |
| 2016/0334154 A1 | 11/2016 | Srichai et al. | |
| 2018/0252425 A1 | 9/2018 | Laughman et al. | |
| 2018/0328673 A1 | 11/2018 | Stoia et al. | |
| 2019/0017751 A1* | 1/2019 | Singh | F28D 15/00 |
| 2020/0041175 A1 | 2/2020 | Rockenfeller et al. | |

OTHER PUBLICATIONS

International Search Report and Written Opinion for International Application No. PCT/US2021/042759 dated Dec. 30, 2021.

* cited by examiner

*Primary Examiner* — Davis D Hwu
(74) *Attorney, Agent, or Firm* — Shumaker & Sieffert, P.A.

(57) ABSTRACT

Disclosed are systems and methods of flexibly cooling thermal loads by providing a thermal energy storage cooling system having a nucleation cooling system for at least initiating nucleation of a phase change media within the thermal energy storage system.

27 Claims, 7 Drawing Sheets

THERMAL ENERGY STORAGE SYSTEM WITH NUCLEATION COOLING

BACKGROUND

Field of the Invention

This disclosure relates generally to a thermal energy storage cooling system that is useful to cool systems that output bursts of heat. In particular, the system may include a thermal energy storage system that uses a separate cooling system to at least initiate nucleation and optionally perform the charging of a phase change material to cool bursts of heat from a directed energy weapons system.

Description of the Related Art

Conventional vapor compression systems may be efficient at cooling environmental loads, such as rooms or systems with relatively slow gains in heat. However, these systems alone do not generally provide the rapid cooling features necessary to cool a system that outputs bursts of heat. A vapor compression system may take up to a minute, or in some cases more time, to reach full capacity and usually several minutes or longer to provide cooling to the target heat load. However, once these vapor compression systems are running, they can be efficient in cooling a target heat load to a specific temperature. In scenarios of limited power availability, the use of a vapor compression system to handle heat bursts may require more power than available or can be stored within the constraints of available space and weight on a platform.

Thermal energy storage systems have been used to level a cooling load by substituting cooling capacity and at times reduce costs or displace additional refrigeration equipment capacity needs in many environments. Many different types of materials have been used as phase change materials within thermal energy storage systems, including inorganic systems such as salt and salt hydrates, organic compounds such as paraffins or fatty acids. Polymeric materials, such as poly(ethylene glycol) have also been used as phase change materials. However, some phase change systems may require a relatively high amount of energy to start a freezing cycle. For example, some phase change materials may need to be cooled far below their phase change temperature to initiate crystal formation (nucleation), which is a necessary first step in freezing the phase change material.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods.

One embodiment is a thermal energy cooling system. This embodiment includes: a thermal energy storage system comprising a phase change material in thermal communication with a plurality of first heat transfer surfaces and second heat transfer surfaces; a first refrigerant or heat transfer fluid in thermal contact with the plurality of first heat transfer surfaces at a first temperature to at least initiate crystallization of the phase change material; and a second refrigerant or heat transfer fluid in thermal contact with the plurality of second heat transfer surfaces at a second temperature that is higher than the first temperature and configured to transfer heat from a thermal load to the plurality of second heat transfer surfaces.

Another embodiment is a thermal energy cooling system for a laser weapon system. This embodiment includes: a thermal energy storage system comprising a tank and a plurality of tubes filled with phase change material; a nucleation cooling system connected to the thermal energy storage system; a plurality of inner tubes traversing the tubes and in fluid communication with the nucleation cooling system that circulates a first refrigerant or heat transfer fluid at a first temperature through the plurality of inner tubes, wherein the first temperature initiates nucleation of the phase change material; a vapor compression system in fluid communication with the tank and configured to circulate a second refrigerant or heat transfer fluid through the tank around the tubes and at a second temperature higher than the first temperature; and a laser weapon system in thermal communication with the thermal energy storage system to transfer heat from the laser weapon system to the phase change material.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Figure 1:
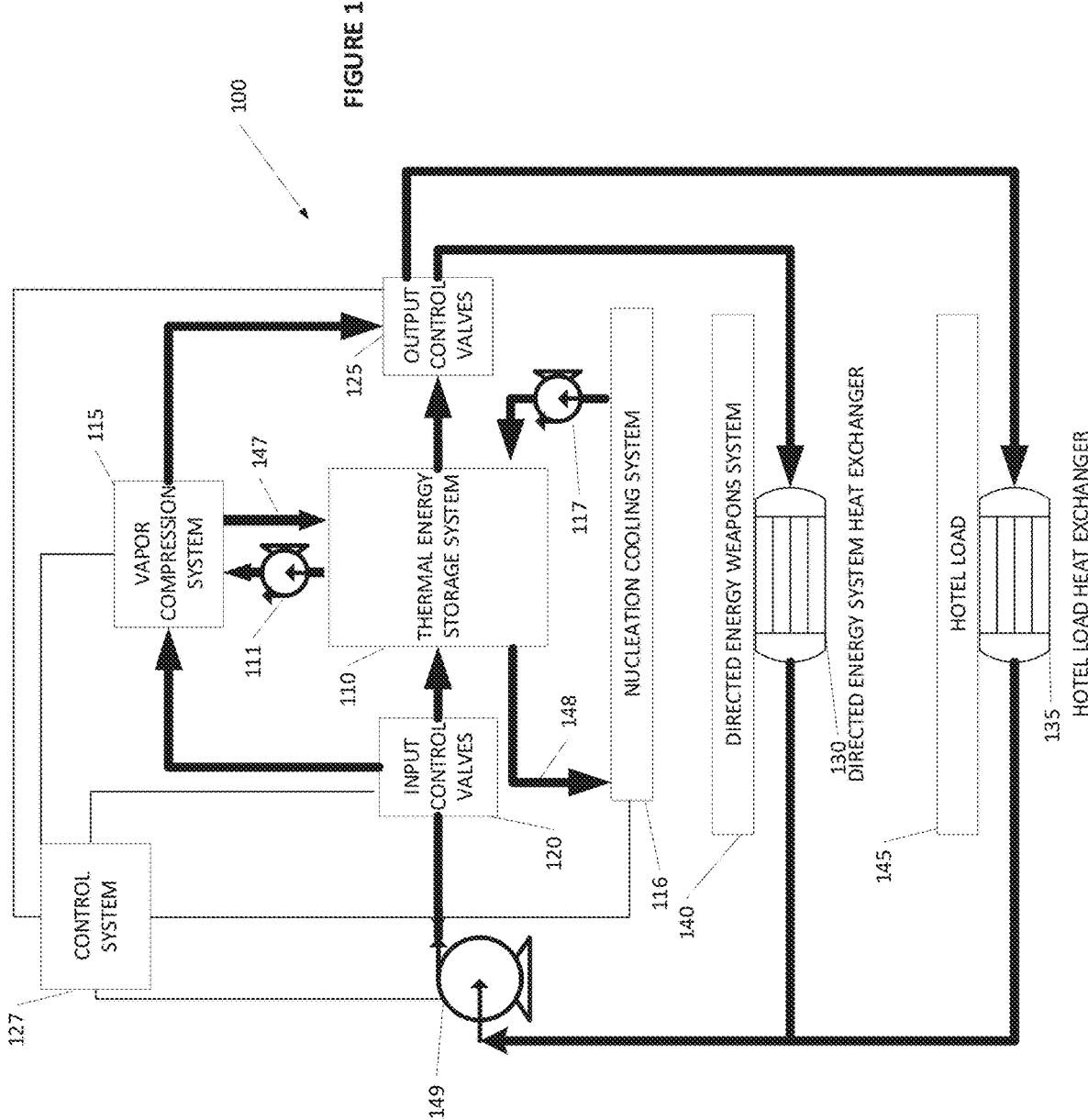
FIG. 1 is a schematic illustration of an embodiment of a thermal energy cooling system having a thermal energy storage system, a vapor compression system and a nucleation cooling system.

Thermal energy cooling systems and methods are disclosed for rapidly cooling products, devices or other heat loads, including ancillary equipment hereafter referred to as hotel loads. Such systems may use a thermal energy storage system configured to rapidly cool bursts of heat, such as from a directed energy weapon system such as a laser weapon system. The thermal energy storage system can act as a sink to absorb heat being generated by the directed energy weapon system without requiring a large amount of energy consumption. In one embodiment, the thermal energy storage system comprises a salt hydrate, such as potassium fluoride tetra hydrate as the phase change material that is used to store cold energy.

In one embodiment the thermal energy storage system comprises a tank filled with a plurality of sealed thermal storage tubes with phase change material inside. A vapor compression system may be used to cool heat transfer fluid or refrigerant that circulates through the tank and around the sealed thermal tubes to freeze the phase change material. Each tube within the tank acts as a heat transfer surface between the phase change material and the heat transfer fluid within the tank. In one embodiment, running laterally through each storage tube filled with phase change material is an inner tube connected to a nucleation cooling system. The nucleation cooling system may pump refrigerant or heat transfer fluid through each inner tube to cool the phase change material within each thermal storage tube. The inner tube acts as a heat transfer surface to transfer heat from the phase change media to the refrigerant or heat transfer fluid to cool the phase change media and to at least initiate or facilitate the phase change from a liquid to a solid form.

As used herein, the term "tube" means any container that may contain phase change media. The tube may be in a variety of longitudinal configurations, including cylindrical, spherical cuboid, conical, triangular prism, hexagonal prism, planar, plates, a stack of plates, and any other related shape.

As mentioned above, many phase change materials need to be cooled below their phase change temperature in order to start a nucleation process that allows the material to freeze. However, once the phase change material has started nucleation, a higher temperature can be used to continue the freezing cycle. Thus, nucleation of the phase change media within the storage tubes may be initiated by the nucleation cooling system by circulating refrigerant or heat transfer fluid at a first relatively low temperature. For example, nucleation cooling system may circulate refrigerant or heat transfer fluid through the thermal storage tubes to maintain a temperature of 3° C. to 8° C. within the thermal storage tubes to initiate nucleation of the phase change media. Once nucleation of the phase change material has started, the nucleation cooling system may raise the temperature of the refrigerant or heat transfer fluid so that the phase change media maintains a temperature of, for example, 10° C. to 15° C. which will continue freezing the phase change media depending on the type of phase change material within the tubes, and its particular phase change temperature. The use of higher temperatures for continuing the crystallization process saves energy by requiring less cooling power to be used for freezing the phase change media after nucleation has been initiated.

In another embodiment, the nucleation cooling system may be used to initiate the nucleation of the phase change media at a lower temperature, but then the vapor compression system connected to the thermal energy storage may be used to continue the freezing process by circulating cold heat transfer fluid or refrigerant within the thermal energy storage tank that holds the storage tubes. For example, the temperature of the heat transfer fluid from the vapor compression system may be chosen to be between 10° C. to 15° C. to continue freezing the phase change media once nucleation has been initiated by the nucleation cooling system.

Overview of Directed Energy Weapons System

In one embodiment, the thermal energy cooling system pumps a heat transfer fluid from a heat exchanger in thermal contact with a directed energy weapons system through the thermal energy storage system to rapidly offload the absorbed heat. The heat transfer fluid may be ethylene glycol water or a phase change refrigerant. In this embodiment, the system may be configured to maintain the fiber amplifiers and other critical system components of the laser weapon system between about 15° C.-35° C., 20° C.-30° C. or 22° C.-28° C. or similar temperature ranges.

Thermal energy storage systems that are applicable for use with the above-mentioned high-energy laser cooling system may be configured to undergo a solid-liquid phase change with a phase transition temperature between about 10° C. and about 25° C. This range may be between about 15° C. and 25° C. assuming that a heat transfer fluid (coolant) flow to the laser has a temperature in the range of about 20° C. to 30° C.

In one embodiment the thermal energy storage system uses a potassium fluoride-based phase change material. The properties of potassium fluoride, and particularly potassium fluoride tetra hydrate allow the thermal energy storage system to rapidly absorb relatively large bursts of heat coming from a system such as a directed energy weapons system. In particular, this salt hydrate was found to have a very good crystal growth propagation following nucleation that spreads throughout the phase change material and aids thermal distribution into the phase change material. This material also has a high thermal conductivity, which helps minimize thermal gradients.

The operating conditions for a laser weapon cooling system in which the phase change materials are used as a thermal energy storage system call for much more rapid melt and freeze periods than traditionally required for seasonal or diurnal thermal energy storage. System discharge (melting) of the phase change material in the thermal energy storage system often has to occur in less than five minutes and more frequently even in less than three, or even two minutes. The time to charge (re-freeze) the phase change material is often also much shorter, typically in less than 20 minutes, and often less than 10, 8, 6, 5 or 4 minutes. Thus, in cases where the phase change material has been completely melted so that no crystals remain, the nucleation cooling system may be initiated to rapidly begin nucleation and freezing of the phase change media. In some embodiments, once the phase change material in the thermal energy storage system is frozen, so that the storage system charged, the phase change material needs to be maintained in its frozen state. To maintain the phase change material in a frozen state, either the nucleation cooling system or a vapor compression system connected to the thermal energy storage may be activated at particular time intervals such that any phase change material which transitioned into a liquid state is cooled and transitioned back into a frozen state and/or maintained in the frozen state.

During use, the laser weapon may be activated for a total firing period of 1, 2 or 3 or even 5 minutes and in some special applications even longer. Since the firing period usually occurs in pulses of several seconds for each target, as short as 2 or 3 seconds and as long as about 10 to 15 seconds, the total discharge period of 1, 2 or 3 or even 5 minutes can occur over periods of 5 to 30 minutes. Depending on the target occurrence, or lack thereof, the system may also be recharged before it is completely depleted. The thermal management system, including the thermal energy storage system, however, usually has a design requirement to be able to operate under a worst case scenario of continuous lasing of 1, 2 or 3 or even 5 minutes and in some special applications even longer, which likely will never occur. Accordingly, the thermal energy cooling system preferably has the capacity to discharge the thermal energy storage system and cool the laser over this entire continuous time period. Of course, the total activation period, including pauses between firing, may be longer, depending on the particular need. In addition, the system preferably can recharge (re-freeze) the phase change media in the thermal energy storage system fairly rapidly once the activation time has ended, for example in less than 30, 20, 10, 8, 6, 5, or 4 minutes so that the thermal energy cooling system can be ready to effectively cool the laser weapon for additional activation periods.

In one embodiment, the thermal energy storage system comprises an enclosure or tank comprising a system of storage tubes holding phase change media that are running throughout the tank. In some embodiments, the storage tubes having annular cross-sections that contain the phase change material and an inner tube containing refrigerant or first heat transfer fluid from the nucleation cooling system circulating through the inner tube while a second heat transfer fluid or refrigerant from the directed energy weapon or a vapor compression cooling system circulates around the outside of the storage tube.

In one embodiment, the thermal energy storage system may be made out of one or more modules, each module having a plurality of storage tubes with phase change material inside the storage tubes and heat transfer fluid flowing on the outside of the storage tubes and within the thermal energy storage tank. Such a plurality of storage tubes may be in multiple planar levels or in one or more bundles. An example storage tube diameter may be 0.5 inch, but embodiments may include storage tubes with an outer diameter between about ¼ inch and 2 inches or above, preferably between about ¼ inch or about 1 inch mostly depending on system response time requirements, but to some degree also depending on heat transfer enhancements or the effectiveness of any crystallization additives used within the phase change material to reduce subcooling. Examples of such crystallization additives include pumice, a textured volcanic glass, which reduces the subcooling during the freezing process.

As mentioned above, running longitudinally within each storage tube is an inner tube from the nucleation cooling system. The inner tube may be chosen to optimize the flow of refrigerant or heat transfer fluid through the inner tube while also providing enough space within the storage tube for a sufficient volume of phase change material to meet the energy storage capacity requirements of the thermal energy storage. For example, if the storage tube filled with phase change material has an outer diameter of 1", the inner tube from the nucleation cooling system running within the storage tube may be ¼" to ½" in diameter. However, if the storage tube is only ½" in diameter, the inner tube may be 1/16" to ⅛" in diameter. It should be realized that these dimensions are exemplary only and are not limiting on the scope of the invention.

As will be described more fully below with reference to FIG. 2B, the nucleation cooling system may comprise a vapor compression loop that circulates refrigerant from a refrigerant receiver or tank through a pump to the inner tubes of the thermal energy storage. After traversing the thermal energy storage system, the refrigerant may be circulated back to the refrigerant receiver. The refrigerant receiver acts as a storage of liquid and vapor refrigerant and is connected to a compressor to compress the vapor to be condensed and routed back into the low temperature receiver. Such system is often referred to as a liquid overfeed system in the refrigeration terms. As illustrated below, the conventional vapor compression loop within the nucleation cooling system comprises a single compressor, however embodiments of the invention may include a nucleation cooling system with multiple compressors. In other embodiments there may be more than vapor compression loop within the nucleation cooling system, with each loop circulating refrigerant to specific inner tubes within the thermal energy storage tank. For example, the thermal energy storage tank may comprise four modules of storage tubes. The nucleation cooling system may comprise two, three, four, five, six or more separate vapor compression loops, with each loop serving to circulate refrigerant to a particular module of storage tubes.

In another embodiment, the nucleation cooling system may not circulate refrigerant to the thermal energy storage system. Instead the nucleation cooling system may cool a heat transfer fluid through a heat exchanger that is pumped through the inner tubes of the thermal energy storage system.

Freezing Operating Mode 1—Nucleation Cooling System Only

In this first operating mode, the nucleation cooling system is used to initiate crystal formation at a first low temperature and then continue with freezing the phase change media at a relatively higher temperature. Typical subcooling for potassium fluoride tetra hydrate phase change medium is 10° C. to 15° C. below its transition temperature of 18° C. This subcooling may be achieved by circulating a refrigerant or first heat transfer fluid within the inner tubes running through the storage tubes containing the potassium fluoride tetra hydrate. Once solidification and freezing of the phase change material has started the nucleation cooling system may circulate higher temperature refrigerant or heat transfer fluid at a temperature that is closer to the transition temperature of the potassium fluoride tetra hydrate to complete the freezing process, provided an adequate differential temperature for rapid freezing is maintained.

This may call for an operating strategy in which a relatively cold refrigerant is circulated to the inner tubes of the thermal energy storage system, of about 0° C.-10° C., preferably 3° C.-8° C., to initiate the nucleation of the phase change material. The remainder of the cooling energy may be provided by circulating refrigerant from the nucleation cooling system that is much closer to the phase change temperature of the potassium fluoride tetra hydrate material, of for example 10° C.-15° C. By continuing to freeze the phase change material with refrigerant or heat transfer fluid at a relatively higher temperature of 10° C.-15° C. for the later stages of the freezing cycle, the overall system conserves energy and is more efficient.

One uniquely desirable feature of conducting the entire freezing process with the nucleation cooling system is that the other cooling system does not have to be altered in its operating temperature at any time to freeze the phase change material but can continue serving hotel loads at the most ideal temperature for such loads and can do so while the nucleation system is charging the thermal energy storage system preparing it for the next laser operation induces burst load to manage or assist with burst cooling.

Freezing Operating Mode 2—Nucleation Cooling Initiation Followed by Second Vapor Compression Loop to Complete or Assist in Freezing In this second operating mode, the nucleation cooling system is used to initiate crystal formation at a first low temperature and then a second vapor compression system that is in thermal contact with the thermal energy storage completes or at least significantly assists in the freezing cycle. For example, the nucleation cooling system circulates refrigerant within the inner cooling tubes to bring the temperature of the phase change media to below the crystallization formation point. For example, for potassium fluoride tetra hydrate, the refrigerant may be cooled to at about 3° C.-8° C. Once crystallization of the phase change material has started the nucleation cooling system may be turned off, operated at the same low or higher temperature, but the second vapor compression system in thermal communication with the storage tubes within the thermal energy storage may be used to continue freezing the phase change material to its final frozen state. The vapor compression system may be used to cool heat transfer fluid that is circulated through the thermal energy storage at a temperature that causes the phase change media to continue changing phase from liquid to solid form. For example, with potassium fluoride tetra hydrate, this may be at a temperature of about 10° C.-15° C.

Freezing Operating Mode 3—Vapor Compression Initiation and Cooling

In this third operating mode, the nucleation cooling system may not be used at all. In some scenarios it may be more efficient to only use the vapor compression system to initiate and freeze the phase change media. In this embodiment, the vapor compression system that is in thermal contact with the thermal energy storage system may first cool a heat transfer fluid to a relatively low temperature such that phase change material within the storage tubes may start to form crystals. Once crystallization of the phase change material has started the vapor compression system may be adjusted to circulate relatively warmer heat transfer fluid, of about 10° C. to 15° C. to continue the freezing cycle. Thus, the vapor compression system may be used to initiate and maintain the phase change media in a frozen state in this operating mode.

Maintenance Operating Mode 1—Nucleation Cooling Only

In this maintenance mode, the nucleation cooling system is only used to maintain the phase change media in a frozen state. During normal use, the phase change material will warm to the ambient temperature unless additional cooling power is added to maintain the thermal energy storage phase change material in a frozen state. In this maintenance mode, the nucleation cooling system circulates refrigerant or heat transfer fluid through the storage tubes of phase change material at a temperature designed to keep the phase change material in a frozen state over time. A control system may monitor temperature sensors to determine the ambient temperature and the temperature of the thermal energy storage system and determine the proper temperature of refrigerant or heat transfer fluid to circulate through the thermal energy storage system to maintain the phase change material in a frozen state.

As mentioned, an advantage of this operating mode is the fact that the second vapor compression system can be dedicated to serve the hotel loads at the optimum temperature for such cooling without any adjustment needs for maintaining the thermal storage system in the frozen state.

Maintenance Operating Mode 2—Vapor Compression Cooling Only

In this maintenance mode, the second vapor compression system is used to maintain the phase change media in a frozen state. During normal use, the phase change material will warm to the ambient temperature unless additional cooling power is added to maintain the thermal energy storage phase change material in a frozen state. In this maintenance mode, the vapor compression system circulates cold heat transfer fluid through the thermal energy storage system and around the storage tubes of phase change material in order to keep the phase change material in a frozen state over time.

In some embodiments, cooling system capacity controls may make it also advantageous to have the nucleation system assist in the maintenance via the second vapor compression loop.

In one embodiment, the system is operated to retain a reserve of frozen phase change material to prevent the phase change material from completely melting. Because the required heat transfer fluid temperature required to initiate crystallization of the phase change material is relatively low, the system may be more energy efficient by keeping a reserve of crystallized frozen phase change material within the thermal energy storage unit. For example, each sub-containment portion of the thermal energy storage system (e.g. tube or channel) may retain a minimum percentage of frozen, crystalized phase change material. For example, the retained minimum percentage may be 1%, 2%, 3%, 4%, 5%, 6%, 7%, 8%, 9%, 10%, 15% or more of the total frozen phase change material. The retained portion may be 2%-5%, 4%-8%, or 5%-10%, 5%-15% 10%-15%, or 15%-20% of total volume of phase change material in the thermal energy storage system. Higher percentages of total frozen phase change material will of course also avoid the need for initial nucleation and crystallization.

If the system retains a minimum amount of frozen phase change material, the temperature of the heat transfer fluid required to freeze the thermal energy storage system can be, for example, between 8° C. and 16° C. If the phase change material is allowed to fully melt, the temperature of the refrigerant or heat transfer fluid from the nucleation cooling system or vapor compression system may need to be 5° C. or colder to initiate crystallization of the phase change material. Accordingly, in one embodiment it is more energy efficient to maintain the retained minimum portion of crystalized, frozen phase change material during cooling operations and prevent the phase change material from completely melting.

In one embodiment, a control system monitors sensors that report the temperature of the phase change material or the heat transfer fluid temperatures entering and exiting the thermal energy storage system along with the flow rate of the refrigerant or heat transfer fluid. From these data, the control system may calculate or estimate the amount of frozen phase change material remaining in the thermal energy storage system. The thermal energy storage system may be made of hundreds of separate tubes or channels. In case of storage tubes, each tube may have more or less frozen phase change material located within it. Measuring the actual amount of frozen phase change material in each individual tube may not be practical, so estimating the amount of frozen phase change material by measuring the overall temperature of the phase change material and refrigerant or heat transfer fluid flows may be more practical.

If the control system determines that the amount of remaining frozen phase change material is below a predetermined threshold, the control system may initiate the nucleation cooling and/or vapor compression system to start circulating refrigerant or heat transfer fluid in order to freeze the phase change material. In addition, the control system may prevent the system from being able to initiate additional cooling operations using the thermal energy storage system until the vapor compression system has had time to freeze more of the phase change material in the thermal energy storage system. In one embodiment, the system may only allow the system to perform additional cooling cycles if, after such a cooling cycle, the remaining frozen phase change material would remain above the minimum set threshold. In other cases, an imminent threat or other condition requiring the laser to fire may override such threshold preservation mode.

To ensure that every storage tube, or almost every storage tube, within the thermal energy storage system is very likely to contain at least some frozen phase change material, the system may choose a minimum set threshold value that is higher than what is needed in any particular tube. For example, the system may set the threshold at 10% or 15%, such that when the control system determines that only 10% or 15% of the total volume of phase change material remains frozen it will activate the nucleation cooling system or vapor control system to start freezing the phase change material. By choosing a minimum value of for example 10% or 15%, this may ensure that each storage tube within the thermal energy storage system has at least some frozen phase change material to start an efficient cooling cycle. Of course, depending on the system design, it may require the minimum threshold to be set at 5%, 10%, 15% or even 20% to ensure that each storage tube within the system contains some amount of frozen phase change material. Selecting a higher percentage is of course always an option, however, the higher the percentage of left-over frozen material, the lower the thermal energy storage system capacity will be.

In one embodiment, the thermal energy storage system acts as a burst mode cooling system to remove the heat generated from each firing event of a directed energy weapons system, such as a laser weapons system. During each firing cycle, the system transfers thermal energy from the weapon to the cooling and thermal energy storage system. In one embodiment this can be accomplished by running the heat transfer fluid outside the storage tubes containing the phase change material. It is also possible, that refrigerant or thermal heat transfer fluid coming from directed energy weapons system and hotel loads may be routed through a vapor compression system to perform initial cooling on the heated thermal transfer fluid, followed by circulation through the thermal energy storage system or routed through the thermal energy storage system first and then followed by the vapor compression system to reach its final temperature.

In another embodiment, the vapor compression system or nucleation cooling system is used to supplement the cooling capacity of the thermal energy storage system as the directed energy weapons system is being fired. Accordingly, during a firing event, the nucleation cooling system, the vapor compression system, and thermal energy storage system may all act in concert to provide cooling capacity to remove heat from the directed energy weapons system and hotel loads. In one embodiment, the control system for the nucleation cooling system and/or vapor compression system is a vector drive controller that is used to increase efficiency of the overall system.

Directed energy weapons systems may also include additional ancillary mechanical or electrical equipment or components that need to be cooled in order to operate the weapons system efficiently. Such additional equipment, also termed a "hotel load" may include sensors, radar systems, batteries, power modules, generators, pumps, motors, computers, electronics and other equipment that is ancillary to the main weapons system. In particularly warm environments, such as the desert, these additional components may work more efficiently by being cooled prior to use. Thus, in one embodiment, the thermal energy cooling system includes a vapor compression system that acts as an ancillary cooling system configured to cool these additional components (as well as the laser diode amplifiers) to a predetermined temperature, or within a temperature range, so that they operate efficiently in warmer environments.

In some embodiments, the directed energy weapons system and hotel loads are located on a single platform. The platform may include a variety of different sensors to monitor and to receive signals from or send signals to components of the directed energy weapons system and the hotel loads. These sensors are used to generate sensor data that is read by the weapon system including the thermal energy cooling system controller in order to determine the proper time to activate the weapon system including the burst mode cooling cycle and discharge the thermal energy storage system. In some embodiments, the controller also receives sensor data from sensors and systems that are not located on the platform, and the controller may use this external sensor data to help determine the correct time to activate the weapon system and the burst mode cooling event.

The one or more vapor compression systems may be composed of multiple compressors, some dedicated to freeze and maintain frozen phase change material, such as potassium fluoride tetra hydrate, in the thermal energy storage system, and some configured to cool the hotel load or the hotel load and the laser cooling load in case of firing. However, given a control signal that there is a need to charge the thermal energy storage system, all compressors may be activated to charge the thermal energy storage system if the hotel load is determined to be able to afford a temporary lack of cooling and the laser is not firing or expected to be firing shortly. This determination may be based on whether the individual components of the hotel load are detected to be at or below their individual component design temperature. The compressors, some or all, may also be used to cool the high-energy laser in parallel to use of the thermal energy storage system being discharged. In some embodiments, the vapor compression system has a capacity of about 1 kW to 50 kW, 51 kW to 100 kW, or up to several hundred kilowatts of cooling power or more.

In some embodiments, the one or more vapor compression systems comprises a vapor compression system with one or more variable speed compressors controlled to vary the output capacity of the vapor compression system. The vapor compression system may be controlled by a Vector Control System (VCS) that is configured to optimize the efficiency of the vapor compression system by varying the torque placed on the compressor.

In some embodiments, the one or more vapor compression systems comprise one or more high voltage variable speed DC compressors to vary output capacity and be able to operate off a high voltage battery.

It should be realized that thermal energy storage systems are not only made from potassium fluoride tetra hydrate, but also from other salt hydrates such as calcium chloride hydrates, calcium chloride/calcium bromide mixture hydrates, sodium based hydrates, lithium based hydrates, such as lithium chlorate tri-hydrate, etc. If such media are used, the operating temperatures may be adjusted to the media specific phase change temperatures and the specific subcooling requirements. In some embodiments, the salt hydrate is the 4 hydrate of potassium fluoride.

In some embodiments, the thermal energy storage system has its own pump connected to route thermal heat transfer fluid through the thermal energy storage system cooling loop. If the thermal heat transfer fluid is a liquid such as ethylene or propylene glycol water, the pump may be a pump that is controlled by a variable speed motor. If the thermal heat transfer fluid is phase change refrigerant, the pump motor may be connected to a vector control system (VCS) programmed to optimize efficiency of the thermal energy storage system pump between the best amount of heat transfer and the resulting pressure drop of the refrigerant.

A control system monitors the temperatures of the various systems, including the directed energy weapons system, the ancillary components, the thermal energy system and the vapor compression systems. The control system uses stored logic and programming to determine the appropriate use of each component. If the system is idle, and the temperature of the thermal energy storage system is high or indicates a partial melt, the control system may activate a vapor compression system to begin re-freezing the thermal energy storage system. However, if the control system also determines that the ancillary components are too hot, the control system may prioritize having the one vapor compression system cool the ancillary components so they don't become damaged before having the vapor compression system re-freeze the phase change material in the thermal energy storage system. The flexibility of the system allows for the control system to work towards being as efficient as possible to cool the components of the system and maintain the system in a state of readiness for the next activation of the directed energy weapons system.

The control system may be configured in many ways to activate a burst mode cooling cycle of the system. In one embodiment, the controller is any electronic device or apparatus that activates, modulates, or deactivates the flow of refrigerant or heat transfer fluids in the system. The control system may include any electronic device or apparatus that controls a pump, fan, or valve which moves heat transfer fluid throughout the system.

In one embodiment, the nucleation cooling system uses a refrigerant to directly cool the phase change material within the thermal energy storage system. By using refrigerant the nucleation and/or freezing process may be faster than freezing with heat transfer fluid. In addition, the use of refrigerant may require less energy to cool the phase change material in comparison to a cooling system that cools a heat transfer fluid which is then pumped through the phase change material.

In one embodiment, the control system is linked to one or more temperature sensors and activates a burst mode cooling cycle when a temperature sensor near the directed energy weapons system reaches a predetermined target temperature. The temperature sensor may be thermally linked to the directed energy weapons system so when that thermal load reaches the predetermined target temperature, a burst mode cooling cycle is begun. Alternatively, the control system may be electronically linked to an activation signal that triggers a burst mode cooling cycle. The activation signal may be controlled by a predictive process that senses a variety of data, including intelligent signaling of approaching target(s) and then predict when to activate a cooling cycle. For example, the control system may sense the present temperature of the thermal load, the time since the last activation, and the state of other equipment of devices linked to the directed energy weapons system. Using this data, the system may activate a burst mode cooling cycle just before the directed energy weapons system starts to heat. In some embodiments, the control system may activate a cooling cycle 1, 2, 3, 4, 5, 6, 10 or more seconds in advance of a determined or predetermined cooling event.

A. System

FIG. 1 shows one exemplary thermal energy cooling system 100 that has a vapor compression system 115 and a nucleation cooling system 116. The thermal energy cooling system 100 is designed to provide burst mode cooling to rapidly cool a directed energy weapons system 140, which may be during the firing event of operation, by moving heat transfer fluid from a heat exchanger 130 adjacent and connected to the directed energy weapons system 140 to a thermal energy storage system 110.

The vapor compression system 115 connects to output control valves 125 which control output of thermal heat transfer fluid from the vapor compression system 115 and/or thermal energy storage system 110 to the heat exchanger 130 that is in thermal communication with a directed energy weapons system 140. The heat exchanger 130 then connects to a pump 149 which communicates with a set of input control valves 120 to form a cooling loop from the vapor compression system 115 and/or thermal energy storage system 110 to the directed energy weapons system 140 and back again.

As shown in FIG. 1, the pump 149 and input control valves 120 connect to the thermal energy storage system 110. The thermal energy storage system 110 may include frozen or partially frozen phase change material, such as potassium fluoride tetra hydrate, that is used to cool the directed energy weapons system 140 while active. The thermal energy storage system 110 is connected to the output control valves 125 which connect the thermal energy storage system to the directed energy weapons system heat exchanger 130. The directed energy weapons system heat exchanger 130 connects to the pump 149 which can return heated thermal heat transfer fluid from the directed energy weapons system heat exchanger 130 to the input control valves 120 and back to the thermal energy storage system 110 in a thermal energy storage system cooling loop.

In some embodiments, the directed energy weapon system may be cooled using both the vapor compression system 115 and the thermal energy storage system 110. For example, the heat transfer fluid cooled by the vapor compression system 115 and the heat transfer fluid cooled by the thermal energy storage system 110 may be circulated to the directed energy weapon system heat exchanger 130. The heat transfer fluids may mix after being cooled by their respective cooling systems and then the heat transfer fluid circulated to the heat exchanger 130 using the output control valves 125. In some embodiments, there may be separate lines where the heat transfer fluids do not mix. For example, the heat transfer fluid from the vapor compression system 115 may circulate directly to the heat exchanger 130. Similarly, heat transfer fluid from the thermal energy storage system 110 may circulate directly to the heat exchanger 130 as well. In some embodiments the flow may be serial through the thermal storage system followed by the vapor compression system or vice versa. In some embodiments the flow can be partially in series and partially in parallel.

In one embodiment, the vapor compression system 115 is designed to form a heat transfer fluid cooling loop to the hotel load heat exchanger 135 in order to cool the components of the system 100 that make up the hotel load. As shown, the output control valves 125 may route heat transfer fluid from the vapor compression system 115 to the hotel load heat exchanger 135 that is adjacent to the hotel load 145. The pump 149 then may recirculate the thermal heat transfer fluid coming from the hotel load heat exchanger 135 back though the input control valves 120 to the vapor compression system 115, forming a hotel load cooling loop.

As shown in FIG. 1, the vapor compression system 115 is also connected to the thermal energy storage system 110 through pipes 147 running heat transfer fluid into the thermal energy storage system 110. The vapor compression system 115 may use a heat exchanger to cool heat transfer fluid and charge the thermal energy storage system 110. It should be realized that the thermal energy storage system 110 may comprise a series of storage tubes filled with phase change media which act as heat exchangers to transfer heat from the heat transfer fluid to the frozen phase change material within the thermal energy storage system 110. The vapor compression system 115 may be used to continue crystallization and freezing of phase change material within the thermal energy storage system 110 after initial nucleation of such material from the nucleation cooling system 116. A pump 111 may circulate the cooled heat transfer fluid from the thermal energy storage system 110 to the vapor compression system 115. The pump 111 and pipes 147 form a vapor compression cooling loop used to cool the thermal energy storage system 110.

It should be realized that in one embodiment the vapor compression cooling loop and the hotel load cooling loop may use the same heat transfer fluid and thereby share some of the same piping, valves and pumps to communicate within the system 100. Alternatively, the system 100 may include parallel cooling loops from the vapor compression system and the thermal energy storage system where they do not share the same heat transfer fluid, piping, valves and pumps, and therefore thermally communicate through the same or different heat exchangers with the directed energy weapons system.

The thermal energy storage system 110 is connected to the nucleation cooling system 116 via pipes 148 and the pump 117. A second heat transfer fluid that is separate from the heat transfer fluid of the vapor compression system 115 may circulate from the nucleation cooling system 116, through pump 117, to the thermal energy storage system 110, and back through the pipes 148 to form a nucleation cooling loop. The second heat transfer fluid may be a different type of fluid from the heat transfer fluid of the vapor compression system 115, or the two fluids may be of the same type. The nucleation cooling system 116 may be used to facilitate crystallization of the phase change material in the thermal energy storage system 110 by providing relatively lower temperature refrigerant or heat transfer fluid through storage tubes 150 (see FIGS. 3 and 4) containing the phase change material to cause nucleation, i.e. initial forming of solid material of the phase change material. After this initial crystallization of the phase change material, then a relatively higher temperature of refrigerant may be used to continue the crystallization. The ability to use higher temperature fluid saves energy. The higher temperature heat transfer fluid may be supplied by the vapor compression system 115, in one embodiment. Alternatively, or in addition, in some embodiments, the higher temperature heat transfer fluid may be supplied by the nucleation cooling system 116 operating at a higher temperature. The preferred heat transfer fluid of the nucleation cooling system 116 is refrigerant supplied to the storage tubes 150 via a liquid overfeed system.

As mentioned above, the thermal energy storage system 110 and vapor compression system 115 are connected to the set of input control valves 120 and output control valves 125. These valves control the flow of thermal heat transfer fluid through the system 100 and into and out of each component. As shown, a control system 127 is in electrical communication with the vapor compression system 115, the nucleation cooling system 116, input control valves 120 and output control valves 125. By opening and closing the electrically controllable valves within the input control valves 120 and output control valves 125 the control system 127 may control which component of the system is circulating heat transfer fluid or refrigerant at any particular time during operation of the system 100.

The output control valves 125 connect to the directed energy system heat exchanger 130 that is in thermal communication with the directed energy weapons system 140. The directed energy weapons system 140 is shown as being thermally connected to the heat exchanger 130. In the case that two phase refrigerant is being circulated within the system 100, it should be realized that the heat exchanger 130 may be an evaporator configured to change or partially change the phase of the refrigerant. In the case that a heat transfer fluid or media such as glycol-water is being circulated, the heat exchangers may be heat transfer tubes, coils or plates configured to absorb heat into the thermal heat transfer fluid.

In one embodiment, the directed energy weapons system 140 may be a high-energy laser, and the directed energy system heat exchanger 130 may be in thermal communication with the laser diodes and diode amplifiers of that system which generate the bulk of heat bursts while the system is activated. A high-energy laser may include lasers that are 3, 5, 10, 15, 30, 50, 75, 100, 125, 150, 250, or 500 kilowatt or higher energy lasers.

The output control valves 125 also connect to the one or more hotel loads heat exchangers 135 that are in thermal communication with the hotel load 145 adjacent to the directed energy weapons system 140. As discussed above, the hotel load 145 may include the batteries, motors, radar, communications and other equipment that is ancillary to the directed energy weapons system. As mentioned above, in the circumstance where thermal transfer media such as glycol-water is used instead of refrigerant, the hotel load heat exchangers may be replaced with a thermal transfer system configured to transfer heat to the thermal transfer media.

It should be realized that the system 100 may include more than the one pump 149 and that additional pumps, fans, valves and motors may be included within the system to operate as described herein. For example, additional pumps may be included adjacent to the output control valves 125 to move thermal heat transfer fluid to the heat exchangers 130, 135. Fans may be disposed adjacent to the directed energy system heat exchanger 130 or hotel load heat exchanger 135 to move heated or cooled air across the heat exchangers.

The system 100 is flexible in that during use the system 100 may route heated fluid from the directed energy weapons system heat exchanger 130 into either or both of the vapor compression system 115 and thermal energy storage system 110. Depending on the temperature of the heat transfer fluid, and the predicted cooling needs of the system, the heat transfer fluid may be routed to only the thermal energy storage system 110 or only the vapor compression system 115 for cooling. However, in some embodiments, the heat transfer fluid may be routed in parallel or sequentially through the thermal energy storage system 110 and the vapor compression system 115.

The control system 127 is also electrically connected with the nucleation cooling system 116. The control system 127 may receive data from sensors and in response control operation of the nucleation cooling system 116 to initiate crystallization of phase change material within the thermal energy storage system 110. Sensors may be located within the thermal energy storage system 110, with the directed energy weapons system 140, within the hotel load 145, and/or within the vapor compression system 115, or any components or pipes connected thereto. For example, temperature sensors within the thermal energy storage system 110 may provide temperature data to the control system 127 which may analyze the data and determine whether to operate the nucleation cooling system 116. The nucleation cooing system 116 may be used if it is determined that initial crystallization has not begun or has not begun sufficiently, or that energy from the phase change material has been completely discharged or discharged beyond a threshold amount, within the thermal energy storage system 110. It may also be used to operate the nucleation cooling system 116 prior to reaching complete melting at a higher temperature to re-freeze or maintain the phase change material as frozen in the thermal energy storage system 110.

Figure 2:
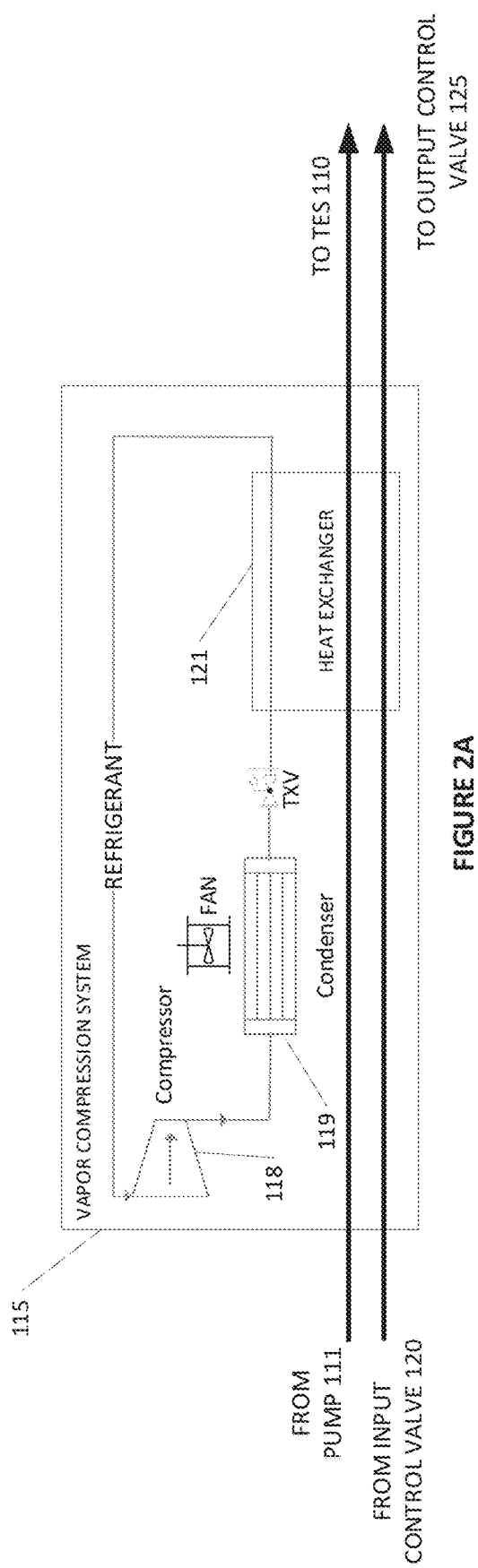
FIGS. 2A and 2B are schematic illustrations respectively of the vapor compression system and the nucleation cooling system of the system of FIG. 1.

FIGS. 2A and 2B are schematic illustrations respectively of the vapor compression system 115 and the nucleation cooling system 116.

As shown in FIG. 2A, the vapor compression system 115 includes a compressor 118, a condenser 119, and a heat exchanger 121 which may be an evaporator. Refrigerant is circulated through the compressor 118, condenser 119, and heat exchanger 121 to remove heat from one or more heat transfer fluids circulating through the heat exchanger 121. As shown, heat transfer fluid may be received from the thermal energy storage system 110 via the pump 111 to be cooled by the heat exchanger 121, and then exit the heat exchanger 121 for circulation back to the thermal energy storage 110. The cooled heat transfer fluid may be used by the thermal energy storage system 110 to continue crystallization of phase change material within the storage system 110, as described herein.

As further shown, heat transfer fluid may circulate from the directed energy system heat exchanger 130 and/or from the hotel load heat exchanger 135 via the input control valve 120. The valve 120 may be operated to cause or prevent flow of heat transfer fluid from the valves 120 to the heat exchanger 121 of the vapor compression system 115 for cooling. The heat transfer fluid from the valve 120 may get cooled by and exit the vapor compression system 115 and circulate to the output control valve 125 for circulation back to the directed energy system heat exchanger 130 and/or to the hotel load heat exchanger 135 to remove heat respectively from the directed energy weapon system 140 and/or the hotel load 145.

As shown in FIG. 2B, the nucleation cooling system 116 includes a compressor 122, a condenser 123, and a refrigerant reservoir 124. Refrigerant is circulated through the compressor 122, condenser 123, and refrigerant reservoir 124 to remove thermal energy from refrigerant circulating through the refrigerant reservoir 124 by re-condensing the refrigerant portion evaporated by the load. Refrigerant may circulate from the thermal energy storage system 110 in which it partially evaporates as it charges the thermal energy storage system to the refrigerant reservoir 124 where it returns as a two-phase mixture of liquid and gas. Refrigerant from the condenser 123 is returned into the reservoir 124 in the liquid phase. The liquid collects at the bottom of the reservoir 124 while the vapor fills the space above the liquid. The liquid refrigerant is then circulated from the reservoir 124 to the thermal energy storage system 110 via the pump 117. The refrigerant is used to cause nucleation, and possibly the entire freezing, of the phase change material within the thermal energy storage system 110, as described herein. The refrigerant then flows from the thermal energy storage 110 back to the nucleation cooling refrigeration system via the pipe 148. If the nucleation cooling system is used to complete the entire freezing cycle, the cooling temperature may be increased after initial nucleation in the storage tubes of thermal energy storage system 110 is achieved.

Inside the reservoir 124, the vapor from the liquid refrigerant is circulated through the vapor compression system 116 to the compressor 122 and then condenser 123 and then cools and changes to a liquid which is then returned back into the reservoir 124.

Figure 3:
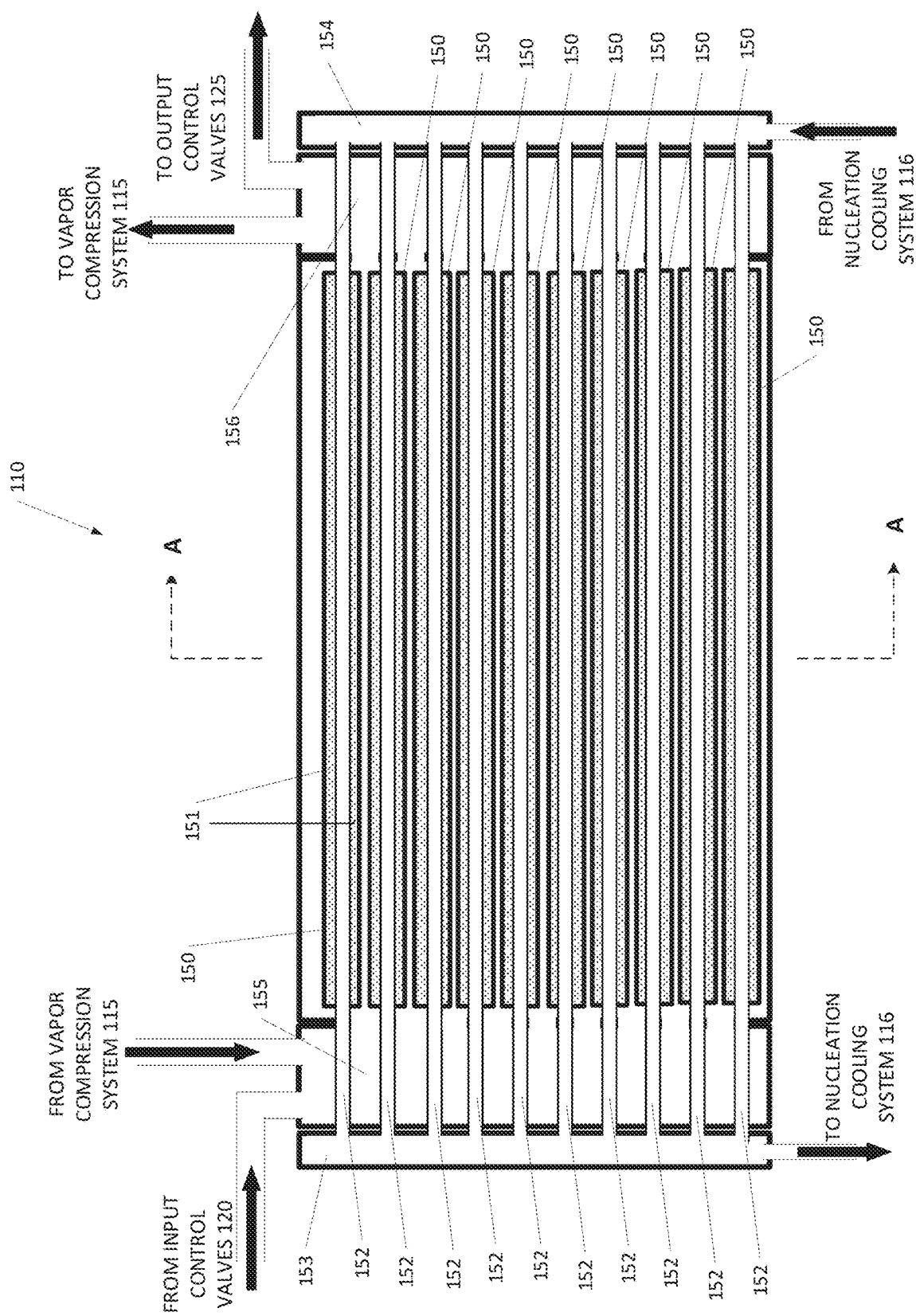
FIG. 3 is a schematic illustration of the thermal energy storage system of FIG. 1, according to one embodiment.

FIG. 3 is a schematic illustration of a cross section of the thermal energy storage system 110, according to one embodiment. The thermal energy storage system 110 includes two separate heat transfer fluid paths for initially causing crystallization of phase change material 151 and then continuing the crystallization process. The phase change material is frozen or partially frozen to provide cooling to heat transfer fluid circulated through the thermal energy storage system 110 that is received from the directed energy system heat exchanger 130 and/or from the hotel load heat exchanger 135 via the input control valves 120 and then exits to flow back to the directed energy system heat exchanger 130 and/or from the hotel load heat exchanger 135 via the output control valves 125.

The phase change material 151 may be a hydrated salt complex, such as potassium fluoride tetrahydrate. The phase change material 151 is contained in a series of storage tubes 150, shown here as elongated, cylindrical tubes having an annular cross-section (see FIG. 4). The storage tubes 150 each have an elongated opening through which an inner tube 152 extends to circulate refrigerant from the nucleation cooling system 116 therethrough. By circulating the refrigerant through the center of the phase change material 151, the phase change material will more efficiently begin to freeze. The design using a separate refrigeration system 116 for nucleation allows for the use of a lower temperature to rapidly initiate nucleation without the need to cool down the entire system heat transfer loop connected to pump 149 to a temperature that may not be ideal for the hotel loads 145 or the pre-cooling of the laser diodes and diode amplifiers within the directed energy weapons system 140. The refrigerant enters the inner tube 152 from the nucleation cooling system 116 via an intake distributor or manifold 154. The distributor or manifold 154 distributes the refrigerant through a set of inner tubes 152 to initiate crystallization of the respective phase change materials contained within respective storage tubes 150. The inner tubes 152 connect to an exit manifold or pipe 153. The refrigerant, now partially evaporated due to transferring heat from the phase change material 151, then circulates from the exit pipe 153 back to the nucleation cooling system 116 for re-condensation.

It should be realized that the thermal energy storage system 110 may include a series of input and output distributors, manifolds, or pipes, wherein each one connects to a row of inner tubes 152 as shown in FIG. 3. For example, the thermal energy storage system 110 may include 2, 5, 10, 20, 30 or more rows of 2, 5, 10, 20, 30 or more inner tubes, with each row being connected to its own input distributor, manifold or tube and output distributor, manifold or tube. The input distributors and output manifolds each come together, respectively, outside of the thermal energy storage system 110 to route refrigerant from and to the nucleation cooling system.

The thermal energy storage system 110 receives heat transfer fluids from the directed energy system heat exchanger 130 and/or from the hotel load heat exchanger 135 via the input control valves 120 and may receive heat transfer fluid from the vapor compression system 115. The heat transfer fluids are received into an entrance manifold 155 and flow over and around the storage tubes 150 and to an exit manifold 156 where it flows back to the vapor compression system 115 and back to the directed energy system heat exchanger 130 and/or from the hotel load heat exchanger 135 via the output control valves 125.

The thermal energy storage system 110 may selectively receive one or the other sources of heat transfer fluid or receive both simultaneously. In some uses of the system 110, the heat transfer fluid may be received from the vapor compression system 115 to continue the crystallization of the phase change material 151, and the circulation of heat transfer fluid from the input control valve 120 may be stopped or reduced. This operation may be used in between firings of the weapons system in order to freeze the phase change material and prepare for another firing of the weapon.

In some uses of the system 110, the heat transfer fluid may be received from the input control valve 120 to cool heat transfer fluid from the weapon or hotel load heat exchangers, and the circulation of heat transfer fluid from the vapor compression system 115 may be stopped or reduced or continued in parallel to achieve maximum cooling capacity during firing.

Figure 4:
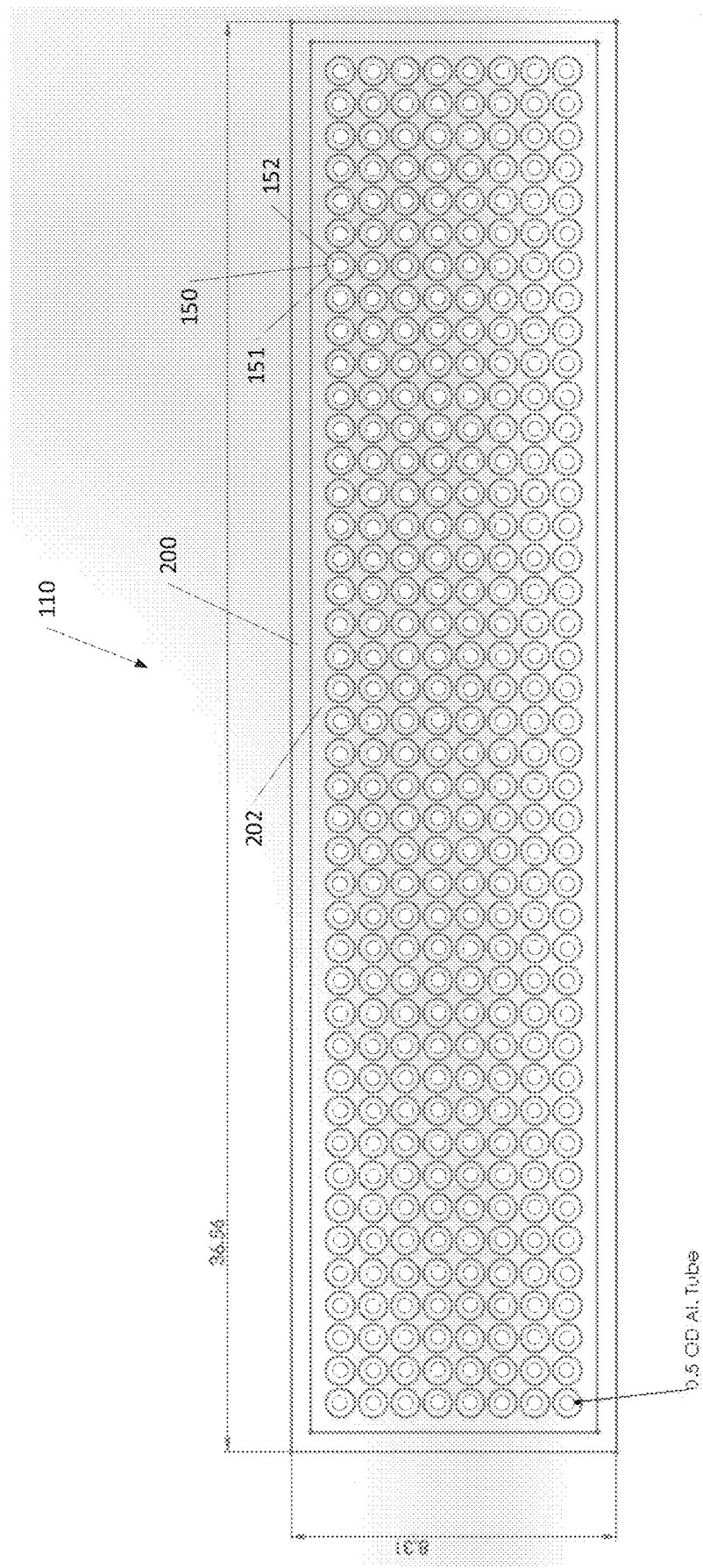
FIG. 4 is a schematic illustration of a cross section of the thermal energy storage system of FIG. 3 as taken along the line A-A shown in FIG. 3, according to one embodiment.

FIG. 4 shows a cross-sectional view of the thermal energy storage system 110 as taken along the line A-A depicted in FIG. 3. As shown in FIG. 4, the thermal energy storage system 110 contains a tank or enclosure 200, filled with a heat transfer fluid 202, and having rows of storage tubes 150 with an opening in the inner tube 152 extending therethrough to form an annular cross-section of the storage tube 150. Each storage tube 150 is filled with phase change material 151 and disposed within a set of support brackets, baffles or cavities within the tank 200. Each storage tube 150 may be cylindrical with a longitudinal cylindrical opening in the inner tube 152 extending therethrough to define an inner cylindrical surface and an outer cylindrical surface forming a closed annular volume of the cylinder comprising the respective portion of the phase change material 151.

The size and number of storage tubes 150 deposited within the tank 200 can be chosen to maximize the thermal transfer of heat from the heat transfer fluid 202 circulating in the tank into the phase change material 151 within the storage tubes 150. The thermal energy storage system 110 may include ten or more, twenty or more, fifty or more, one hundred or more, two hundred or more, three hundred or more, five hundred or more or eight hundred or more storage tubes 150. In some embodiments, there are ten to a thousand of the storage tubes 150.

In some embodiments, the cooling system 100 may include multiple thermal energy storage systems 110. Each thermal energy storage system 110 may form a "module." There may be two, three, four, five, six, seven, eight, nine, ten or more of the thermal energy storage systems 110 or modules within a system. In some embodiments, the directed energy weapons system 140 is a high-energy laser having a power between about 30 kW and about 70 kW and the system 100 includes from two to six or more of the thermal energy storage systems 110 or modules. In some embodiments, the directed energy weapons system 140 is a high-energy laser having a power of 100 kW to 500 kW and the system 100 includes two, four, six, eight or over a dozen of the thermal energy storage systems 110 or modules. In some embodiments, the directed energy weapons system 140 is a high-energy laser having a power between about 5 kW and about 20 kW and the system 100 includes one, two, three, or four of the thermal energy storage systems 110.

In this embodiment, the storage tubes may have an outer diameter of 0.5", but they could be any dimension between ¼" and 1" or even 1.5" or 2" and functionally similar. Each tank may have 25, 50, 100, 200, 300, 400, 500, 1000, 2000, 3000, 4000, 5000 or more storage tubes depending on the specific architecture of the thermal energy storage system. In one embodiment, the tank 200 includes about 300 storage tubes that are 0.5" in outer diameter and about 60 inches in length.

Figure 5:
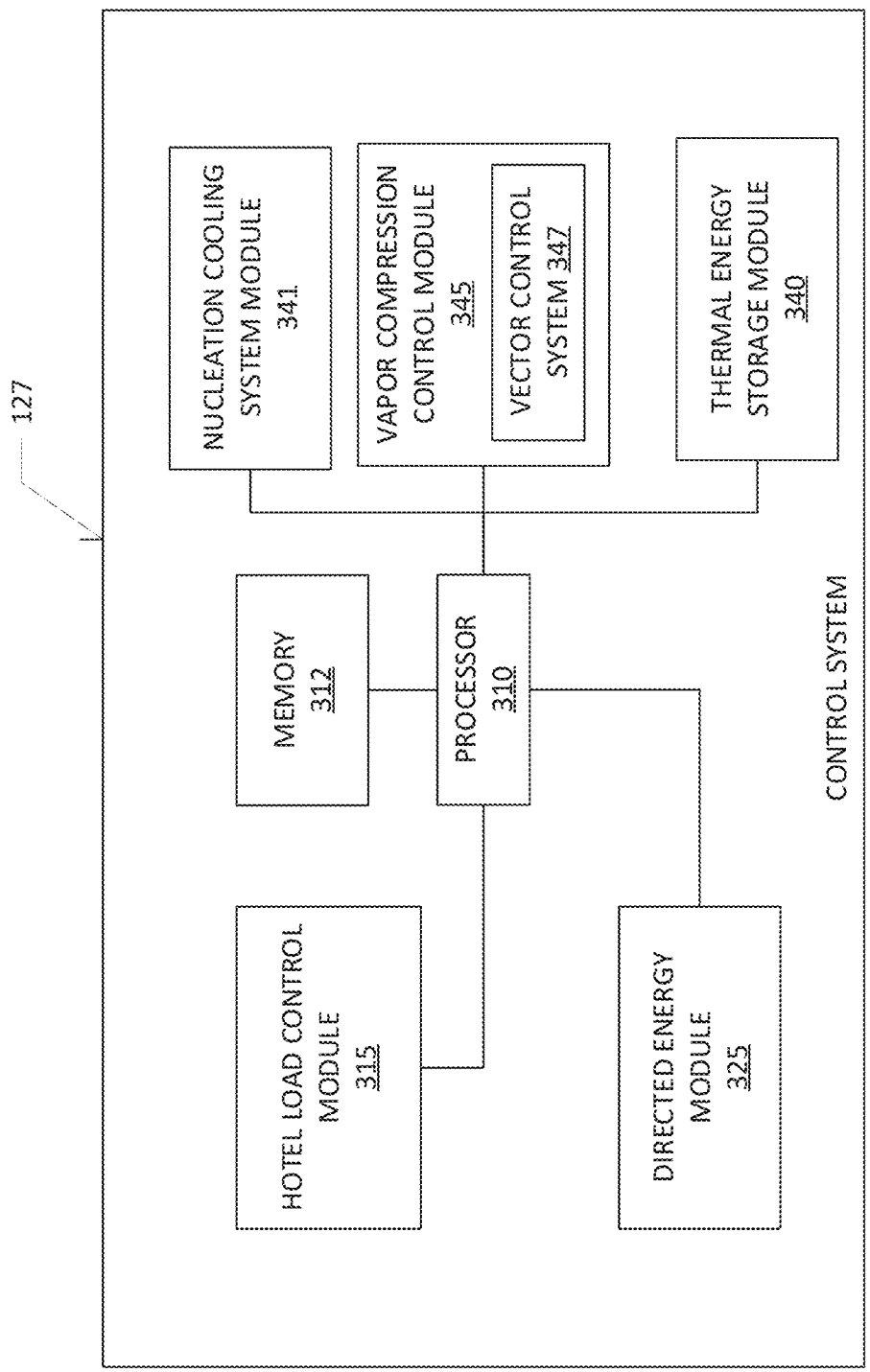
FIG. 5 is a block diagram of an embodiment of a control system that is part of the thermal energy cooling system of FIG. 1.

FIG. 5 shows an illustration of the control system 127, which is programmed with instructions to control operations of the cooling system 100. The control system 127 includes a processor 310 which may be any type of well-known microprocessor or microcontroller that is capable of managing the valves, pumps, fans and other components of the system 100. The processor 310 is connected to a memory 312 for storing programs and commands for operating the system.

The processor 310 is connected to a directed energy module 325 which includes instructions for activating a cooling cycle in response to the directed energy weapons system 140 being activated by firing or anticipated to activated for firing. In one embodiment, the directed energy module 325 is programmed to activate the burst mode cooling cycle from the vapor compression system 115 and/or thermal energy storage system 110 to rapidly cool the thermal load when a predetermined signal is received by the control system 127. The signal may be an activation signal from a firing system connected to the directed energy weapons system 140. With each firing event, the weapon system may interface with a vapor compression control module 345 and/or thermal energy storage module 340 to trigger the burst cooling mode of the system 100 in order to maintain and control the temperature of the weapon system.

In one embodiment, the directed energy module 325 communicates with a sensor such as a temperature sensor which monitors the temperature of the directed energy thermal load. In one embodiment, the directed energy module 325 activates a burst cooling cycle by interfacing with the vapor compression control module 345 when the temperature of the directed energy load reaches a predetermined temperature. For example, when the temperature of the directed energy system is above 30° C., then the directed energy module 325 instructs the vapor compression control module 345 to begin rapidly circulating heat transfer fluid to the directed energy weapons system heat exchanger 130 and through the thermal energy storage system 110. When the temperature is below 15° C. a heating system is activated to bring up the temperature. In some embodiments, the vapor compression control module may be activated when the temperature of the directed energy load is above 25° C. or above 35° C. In some embodiments a heating system may be activated when the temperature of the directed energy system is below 10° C. or below 20° C.

Of course, embodiments are not limited to performing only a single burst cooling procedure. During activation, the thermal load, or an attached weapons system, may request multiple burst mode cooling operations to maintain the temperature of the thermal load below or within a certain target temperature range.

While burst mode cooling can be performed by operating the vapor compression system 115 alone or the vapor compression system 115 and the thermal energy storage system 110, in some embodiments, the system performs a burst mode cooling cycle by only communicating with the thermal energy storage system 110. For example, as shown in FIG. 5, the thermal energy storage module 340 may also be activated by the directed energy module 325 to begin a cooling cycle in response to the directed energy weapons system 140 being discharged. For example, as of a discharge or in anticipation of a discharge the directed energy module 325 may instruct the thermal energy storage module 340 to begin a cooling cycle. The thermal energy storage module 340 would then adjust the input control valves 120 and output control valves 125 so that thermal heat transfer fluid running through the thermal energy storage system 110 begins circulating in a thermal energy cooling loop though the heat exchanger 130 adjacent to the directed energy weapons system 140.

The vapor compression control module 345 may include instructions for managing the motor, valve and pump functions of the vapor compression system 115 as discussed above. For example, the vapor compression control module 345 may control the input valves and output valves, along with valves routing thermal heat transfer fluid into and out from the thermal energy storage system 110. By manipulating these valves, the vapor compression control module 345 may route thermal heat transfer fluid to the particular components of the system 100 as needed to efficiently operate the system.

As shown the vapor compression control module may also include a vector control system 347 that is configured as discussed above to provide efficient control of the vapor compression system compressor and torque. For example, the vector control system 347 may monitor the torque placed on a compressor within the vapor compression system and adjust the speed of one or more fans or blowers to alter the pressure within the system to increase, or decrease, the torque placed on the compressor to increase the vapor compression system efficiency.

Alternately, the vapor compression control module 345 may also include a high voltage DC compressor control system that can easily be operated off high voltage DC battery systems. Such DC system may also monitor torque and serve as vector drive.

After the burst mode cooling requests have subsided, the thermal energy storage module 340 may communicate with a sensor such as the temperature sensor within the thermal energy storage system and in response activate the vapor compression system 115 and/or nucleation cooling system 116 to start cooling the thermal energy storage system 110 back down to its target temperature and freeze the phase change material.

As shown, the control system 127 also includes a nucleation cooling system module 341 for controlling cooling of the phase change media in the thermal energy storage system 110. The nucleation cooling system module 341 may include instructions for operating the pump 117 to circulate heat transfer fluid from the nucleation cooling system 116 through the inner tubes 152 of the thermal energy storage system 110 to initiate crystallization of the phase change material 151 within the storage tubes 150. Data from one or more sensors, such as temperature data from temperature sensors, within the thermal energy storage system 110 may be received by the control system 127 and the nucleation cooling system module 341 may be further programmed to begin, increase the rate of, decrease the rate of, or cease, the flow of heat transfer fluid from the nucleation cooling system 116 to the thermal energy storage system 110.

In some embodiments, the nucleation cooling system module 341 has instructions to communicate with the vapor compression control module 345 when one or more temperatures within the thermal energy storage system 110 reaches a certain threshold indicative of a desired amount of crystallization of the phase change material. The instructions may cause the control system 127 to then operate the vapor compression system 115 to provide further heat transfer fluid to continue the crystallization of the phase change material, to not provide cooling from vapor compression system 115 and let nucleation cooling system 116 perform the entire charge or any combination thereof. The nucleation cooling system module 341 and the vapor compression control module 345 may be programmed to circulate refrigerant from the nucleation cooling system 116 at a first relatively lower temperature and after initial crystallization of the phase change material based on temperature sensor feedback to then circulate a heat transfer fluid from the vapor compression system 115 at a second relatively higher temperature as compared to the first temperature of the refrigerant to continue the crystallization or increase the temperature of nucleation system 116 after initial nucleation and operate system 116 to complete the freezing process or use both systems 115 and 116 to complete the freezing process.

In some embodiments, during lasing at maximum thermal load conditions, not only could vapor compression system 115 and thermal energy storage system 110 be used simultaneously to maximize cooling output, but nucleation system 116 may also be engaged at the same time to provide additional cooling through the thermal energy storage system 110.

As shown, the control system 127 also includes a hotel load control module 315 for controlling cooling of the hotel loads within the system 100. The hotel load control module 315 may include instructions for reading data from temperature or other environmental sensors and determining the proper parameters for cooling or heating the hotel load or adjacent systems of the directed energy weapons system. For example, if the hotel load control module 315 receives data showing that the hotel load is above 40° C. it may activate the vapor compression system 115 to begin a cooling cycle to reduce the temperature of the hotel load back down to a target temperature. Similarly, if the hotel load control module 315 determines that the thermal load is below, for example, 5° C. it may initiate a heating cycle of the vapor compression system or an auxiliary heater to increase the temperature of the thermal load up to a target temperature.

It should be realized that aspects of the control system may manage the variable speed operation of various pumps and fans within the system based on the temperature of the thermal load. For example, as the temperature of the thermal load, or surrounding environment, increases the speed of pumps and fans within the system may also increase. Similarly, as the temperature of the thermal load, or surrounding environment decreases, the controller may slow the speed of the pumps and/or fans.

B. Operation

In operation, a cycle may be activated when a directed energy weapons system is first begun to be powered up for use. While the below operation is described for circulating refrigerant to the hotel load and directed energy system heat exchanger, it should be realized that the system is not limited to using phase change refrigerant, and thermal heat transfer fluids may also work similarly within the system.

As can be realized, these systems include ancillary equipment that may need to be cooled before the system becomes fully operational. For example, the ancillary equipment may be powered on along with the vapor compression system. The control system may therefore activate the output control valves such that the refrigerant output of the vapor compression system is routed to the various components of the hotel load heat exchanger, the input control valves are set to recirculate the refrigerant from the hotel load heat exchanger back to the vapor compression system, and the pump is activated to move the refrigerant in a cooling loop to begin removing heat from the hotel load. The nucleation cooling system 116 may also be operated to facilitate cooling the ancillary equipment, albeit through the thermal energy storage system in the examples shown in the drawing. Different valving could make the nucleation system also available to hotel loads, if needed.

The control system 127 may detect the temperature of the thermal energy storage system 110 using a temperature sensor, and determine if the thermal energy storage system 110 is cooled to a target temperatures so that it may act as a heat capacitor to absorb excess heat from the system once the system becomes operational. If the control system 127 determines that the temperature of the thermal energy storage system 110 is above a predetermined threshold it may begin routing thermal heat transfer fluid or refrigerant that has been cooled by the vapor compression system 115 and/or the nucleation cooling system 116 into the thermal energy storage system. The control system 127 may include programming to balance the cooling requirements of the hotel load against the necessity to also cool the thermal energy storage system 110, and determine the priority for each system based on their current temperature and how soon the system may need to use the thermal energy storage system 110.

Once the system is ready to fire, the vapor compression system 115 may be put into a standby mode where it is ready to begin burst mode cooling as soon as a firing event is detected or a control signal indicates immediate firing to be initiated. Once a firing event is signaled or detected the system will enter a burst mode cooling cycle. The control system 127 will activate the thermal energy storage system 110 loop so that heated thermal heat transfer fluid from the directed energy system heat exchanger is routed into the thermal energy storage system and possibly assisted by vapor compression system 115 to maximize cooling output.

As the directed energy system heat exchanger 130 continues to detect firing events and transfers heat from the heat exchanger 130 to the thermal energy storage system 110 for burst cooling, the control system 127 may monitor each component to ensure that the flexible system is operating efficiently. For example, in one embodiment in the first 5, 10, 15, 20, 25, 30 or more seconds following activation, the heated thermal heat transfer fluid from the directed energy system heat exchanger 130 may not be routed to the vapor compression system 115 because the cooling requirement during that firing event may be handled sufficiently by the thermal energy storage system 110. However, as the firing events continue and the thermal load of the directed energy weapons system 140 maintains or increases, the control system 127 may route a portion of the heat transfer fluid coming from the directed energy weapons system heat exchanger 130 directly to the vapor compression system. The nucleation cooling system 116 may also be operated as described herein to facilitate freezing of the phase change material within the thermal energy storage system 110.

It should be realized that in some embodiments the vapor compression cooling system 115 is used to supplement the cooling provided by the thermal energy storage system 110. Thus, following activation, the thermal energy storage system 110 may provide rapid burst mode cooling for the first seconds after the weapon's activation. Then, or even simultaneously, the vapor compression system 115 may be activated to provide a secondary cooling loop to the directed energy weapons system heat exchanger 130 and provide additional cooling capacity above that provided by the thermal energy storage system 110. Alternately, the vapor compression system 115 may be used first with the thermal energy storage system 110 following thereafter. In such cases, the nucleation cooling system 116 may also be operated to more rapidly cool and freeze, or keep frozen, the phase change material within the thermal energy storage system 110.

Figure 6:
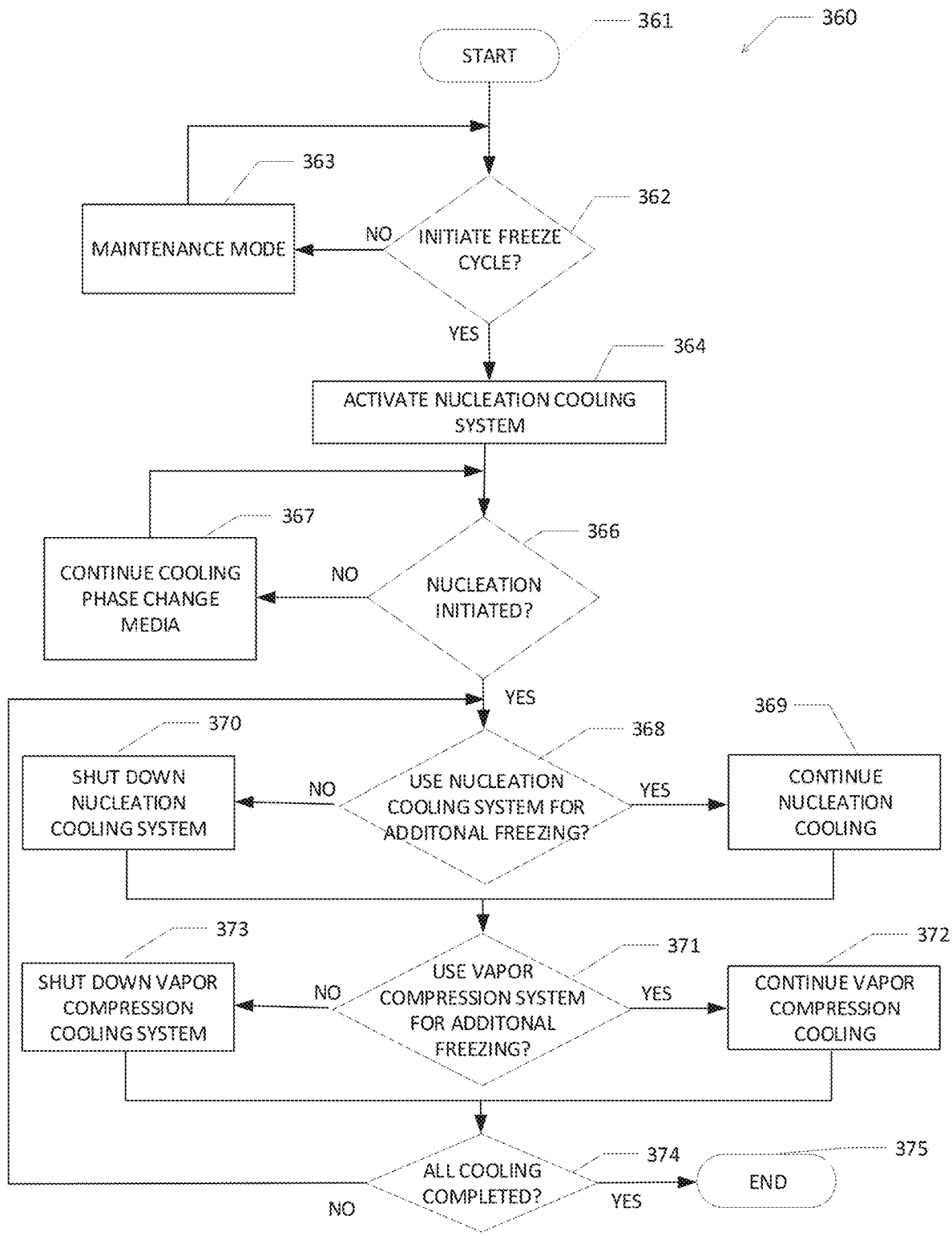
FIG. 6 is a flow diagram of one embodiment of operating the thermal energy cooling system of FIG. 1 using the nucleation cooling system to facilitate nucleation of the phase change material in the thermal energy storage system.

FIG. 6 is a flow chart showing an embodiment of a process 360 for facilitation of a phase change material freeze cycle using a nucleation cooling system. The process 360 begins at a start state 361 and then moves to a decision state 362 where a determination is made whether to initiate a freeze cycle. The determination may be made based on temperature sensor data, weapon firing data, or freezing progress of the phase change material. If it is determined in step 362 that a freeze cycle is not to be initiated, then the process 360 moves to state 363 and enters a maintenance mode. In the maintenance mode the nucleation cooling system may be kept off or kept at a current or other operating level.

If a determination is made at the decision state 362 to initiate a freeze cycle, then the process 360 moves to state 364 where the nucleation cooling system is activated. The nucleation cooling system may circulate refrigerant at a first temperature through the inner tubes traversing the storage tubes of the phase change material in the thermal energy storage system to cause nucleation of the material.

The process 360 then moves to decision state 366 where it is determined if nucleation of the phase change material has initiated. This may be determined, for example by determining nucleation or freezing, of the phase change material, or a threshold amount of nucleation, has been initiated. If it is determined in state 366 that nucleation or a threshold amount of nucleation has not been initiated, then the process 360 moves to state 367 where nucleation of the phase change material is continued. The cooling may be continued by the circulation of the refrigerant from the nucleation cooling system through the thermal energy storage system.

If it is determined in state 366 that nucleation or a threshold amount of nucleation has been initiated, then the process 360 moves to decision state 368 where it is determined if the nucleation cooling system will be used to continue freezing of the phase change material, following nucleation. This determination may be made by gathering data from various sensors, such as temperature sensors, or based on the energy consumption or other conditions of the system. If in state 368 it is determined that the nucleation cooling system will be used to continue freezing of the phase change material, then the process 360 moves to state 369 where the nucleation cooling cycle is continued. If in state 368 it is determined that the nucleation cooling system will not be used for additional freezing of the phase change material, then the process 360 moves to state 370 where the nucleation cooling system is shut down. The process 360 then moves to a decision state 371 to determine if the vapor compression system will be used to continue freezing of the phase change material.

A determination is then made at decision state 371, whether additional freezing from the vapor compression cooling system is needed. For example, if the nucleation cooling system is already activated and freezing the phase change material, then the vapor compression system may not need to be activated to also cool the phase change material within the thermal energy storage system. However, if the nucleation system was only used to initiate nucleation and is not being used to continue freezing the phase change material following nucleation, then the vapor compression system may be activated to continue with the process of freezing the phase change material.

If in state 371 it is determined that additional freezing from the vapor compression system is needed, then the process 360 moves to state 372 where the cooling and further freezing of the phase change material from the vapor compression system is continued. If in state 371 it is determined that additional freezing from the vapor compression system is not needed, then the process 360 moves to state 373 where the vapor compressions system is shut down. This may occur when the nucleation cooling system is already freezing the phase change material.

The process 360 then moves to decision state 374 where it is determined if all cooling is completed. Such decision may be determined by analyzing data from the various sensors as described. If it is determined in decision state 374 that all cooling is not completed, then the process 360 moves back to decision step 368 and proceeds as described above. If it is determined in decision state 374 that all cooling is completed, then the process 360 moves to state 375 and ends. After this freezing process ends, the thermal energy storage system would typically enter a maintenance mode where the vapor compression system or nucleation cooling system would be used to maintain the phase change material in a frozen state.

Figure 7:
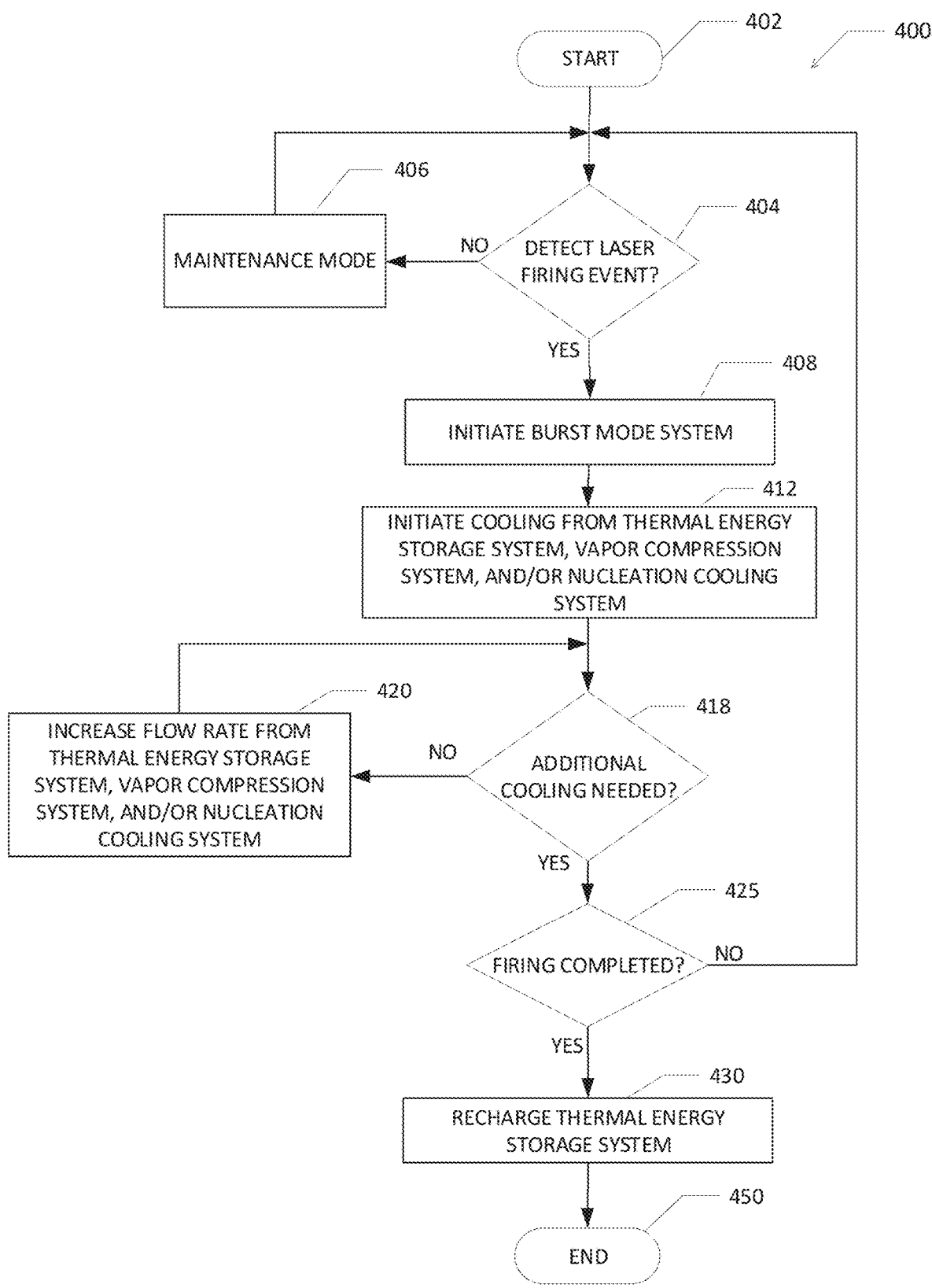
FIG. 7 is a flow diagram of one embodiment of operating the thermal energy cooling system of FIG. 1.

FIG. 7 describes one process 400 for cooling a directed energy weapon system, such as a laser weapon. The process 400 begins at a start state 402 and then moves to a decision state 404 wherein a determination is made whether an imminent or current laser firing event has been detected by the control system. If a laser firing event is not detected the process 400 moves to state 406 and enters a maintenance mode. In the maintenance mode, the system continues to maintain the hotel load at a target operational temperature so that the system is ready to operate once a firing event has been detected. During the maintenance mode the nucleation cooling system and/or the vapor compression system may be used to maintain or recharge the phase change material or media housed within the thermal energy storage system so that the thermal energy storage system is prepared to deliver cooling power to the system when needed.

If a determination is made at the decision state 404 that a current or imminent laser firing event has been detected, then the process 400 moves to a state 408 wherein the thermal energy storage system is initiated to quickly absorb a burst of heat, for example 10, 25, 50, 100, 150, 200 or more kilowatts of heat energy from the laser system. After activating of the burst mode cooling system at the state 408, the process 400 moves to a state 412 wherein a cooling loop from the thermal energy storage system and/or the vapor compression system is activated to provide additional cooling power to the laser weapon. These two cooling sources may come on at the same time, for example where the vapor compression system is possibly on already to cool hotel loads at reduced capacity cooling and only needs to ramp up to provide additional cooling power. Because the vapor compression system may take additional time to absorb heat, it may be used as an ancillary cooling supply to the more rapid cooling provided in the first few seconds in a firing event by the thermal energy storage system. In some embodiments, the nucleation cooling system may also be activated in state 412 to provide supplemental cooling capacity to freeze the phase change material in the thermal energy storage system. For instance, where very high and/or sustained heating loads need cooling, all three of the thermal energy storage system, the vapor compression system, and the nucleation cooling systems may be used together to provide an ability to rapidly cool the laser weapon system and hotel loads in one scenario.

After cooling is initiated from the thermal energy storage system, vapor compression system and nucleation cooling system at state 412, the process 400 moves to a decision state 418 wherein a determination is made whether further or additional cooling is needed. The determination may be made based on anticipated firing events to maintain the laser weapons system at its target temperature or range. Typically, this target temperature may be between 15° C. and 30° C. If it is determined that additional cooling is needed, then the process 400 moves to a state 420 wherein the flow rate of the one or more cooling loops from the thermal energy storage system, the vapor compressions system, and/or the nucleation cooling system may be increased to help move additional heat away from the laser weapons system. The vapor compression system may be ramped up in cooling capacity to add additional cooling power to the overall system and help maintain the temperature of the laser weapons system in the allowable range.

If a determination in decision state 418 is made that additional cooling is not needed, then the process 400 moves to a state 425 wherein a determination is made whether the laser firing process has been completed. If the process has not been completed, then the process 400 returns to the decision state 404 in order to wait for additional firing events. If a determination is made at the decisions state 425 that the laser firing has been completed then the process 400 moves to a state 430 wherein the vapor compression system may be shut down, merely support hotel loads or may begin recharging the phase change material within the thermal energy storage system so it can be ready to provide additional cooling for future firing events. The process 400 then moves to an end state 450 and terminates.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A thermal energy cooling system, comprising:
 a thermal energy storage system comprising a phase change material in thermal communication with a plurality of first heat transfer surfaces and a plurality of second heat transfer surfaces;
 a first refrigerant or heat transfer fluid in thermal contact with the plurality of first heat transfer surfaces at a first temperature to at least initiate crystallization of the phase change material; and
 a second refrigerant or heat transfer fluid in thermal contact with the plurality of second heat transfer surfaces at a second temperature that is higher than the first temperature and configured to transfer heat from a thermal load to the plurality of second heat transfer surfaces,
 wherein the plurality of second heat transfer surfaces comprise a plurality of tubes filled with the phase change material.

2. The system of claim 1, wherein the plurality of tubes comprise from ten to five hundred tubes.

3. The system of claim 1, wherein each tube in the plurality of tubes are cylindrical and comprise an inner tube running therethrough, and wherein a plurality of the inner tubes comprise the plurality of first heat transfer surfaces.

4. The system of claim 3, wherein the plurality of inner tubes are fluidly connected to one or more cooling systems that pump the first refrigerant or heat transfer fluid through the plurality of inner tubes.

5. The system of claim 4, wherein the one or more cooling systems are one or more vapor compression cooling systems.

6. The system of claim 5, wherein the one or more vapor compression cooling systems each comprise a compressor, a condenser, and a refrigerant reservoir, and are configured to receive a liquid refrigerant from the condenser and direct the liquid refrigerant through the inner tubes of the thermal energy storage system to cause at least a partial phase change to a vaporous refrigerant and to flow the vaporous refrigerant from the reservoir to the compressor.

7. The system of claim 6, wherein the liquid refrigerant is directed with a refrigerant pump.

8. The system of claim 6, wherein the vapor compression system comprises one or more high voltage DC compressors that can be operated off a high voltage battery system.

9. The system of claim 1, wherein the thermal energy storage system comprises a tank and the second refrigerant or heat transfer fluid surrounds the plurality of tubes.

10. The system of claim 9, wherein the second refrigerant or heat transfer fluid is cooled by one or more vapor compression systems that pump the second refrigerant or heat transfer fluid through the tank with flow in heat transfer contact with the plurality of tubes to freeze the phase change material.

11. The system of claim 1, further comprising a plurality of the thermal energy storage systems each having its own vapor compression system to facilitate the crystallization of the phase change material.

12. The system of claim 1, wherein the thermal energy cooling system is configured to continue circulating the first refrigerant or heat transfer fluid across the plurality of first heat transfer surfaces after the crystallization of the phase change material is initiated to freeze the phase change material.

13. The system of claim 12, wherein the thermal energy cooling system is configured to continue circulating the first heat transfer fluid at a higher temperature than the first temperature after the crystallization of the phase change material is initiated to freeze the phase change material.

14. The system of claim 1, wherein the phase change material has a transition temperature of between 10° C. and 20° C.

15. The system of claim 1, wherein the phase change material is a hydrated salt complex.

16. The system of claim 15, wherein the hydrated salt complex is potassium fluoride tetrahydrate.

17. The system of claim 1, wherein the first temperature is between 0° C. and 10° C.

18. The system of claim 1, wherein the second temperature is between 10° C. and 15° C.

19. A thermal energy cooling system for a laser weapon system, comprising:
 a thermal energy storage system comprising a tank and a plurality of tubes filled with phase change material;
 a nucleation cooling system connected to the thermal energy storage system;
 a plurality of inner tubes traversing the tubes and in fluid communication with a first refrigerant or heat transfer fluid at a first temperature circulated by the nucleation cooling system, wherein the first temperature initiates nucleation of the phase change material;
 a vapor compression system in fluid communication with the tank and circulating a second refrigerant or heat transfer fluid through the tank around the plurality of tubes, wherein the second refrigerant or heat transfer fluid is at a second temperature higher than the first temperature,
 wherein the first refrigerant or heat transfer fluid is in thermal contact with a plurality of first heat transfer surfaces defined by the plurality of inner tubes, and
 wherein the second refrigerant or heat transfer fluid is in thermal communication with a plurality of second heat transfer surfaces defined by the plurality of tubes, and
 wherein the phase change material is in thermal communication with the plurality of first heat transfer surfaces and the plurality of second heat transfer surfaces; and
 a laser weapon system in thermal communication with the thermal energy storage system to transfer heat from the laser weapon system to the phase change material.

20. The system of claim 19, wherein the second refrigerant or heat transfer fluid at the second temperature is configured to continue crystallization of the phase change material following initial nucleation.

21. The system of claim 19, wherein the first refrigerant or heat transfer fluid from the nucleation cooling system continues the crystallization of the phase change material to charge the thermal energy storage system while the second refrigerant or heat transfer fluid at the second temperature cools hotel loads related to the laser weapon system.

22. The system of claim 19, further comprising a control system programmed to read sensor data and determine when to initiate cooling of the laser weapon to initiate discharge of the thermal energy storage system.

23. The system of claim 22, wherein the control system is further programmed to detect that the thermal energy storage is not entirely discharged after a firing of the laser weapon and in response circulate the second refrigerant or heat transfer fluid through the thermal energy storage system to continue the crystallization of the phase change material.

24. The system of claim 23, wherein the laser weapon system has a power between about 30 kW and about 70 kW and the system comprises from two to six of the thermal energy storage systems.

25. The system of claim 23, wherein the laser weapon system has a power of about 100 kW to 500 kW and the system comprises from two to thirty of the thermal energy storage systems.

26. The system of claim 23, wherein the laser weapon system has a power between about 5 kW and about 20 kW and the system comprises from one to four of the thermal energy storage systems.

27. A thermal energy cooling system, comprising:
a thermal energy storage system comprising a phase change material in thermal communication with a plurality of first heat transfer surfaces and a plurality of second heat transfer surfaces;
a first refrigerant or heat transfer fluid in thermal contact with the plurality of first heat transfer surfaces at a first temperature to at least initiate crystallization of the phase change material; and
a second refrigerant or heat transfer fluid in thermal contact with the plurality of second heat transfer surfaces at a second temperature higher than the first temperature and configured to transfer heat from a thermal load to the plurality of second heat transfer surfaces,
wherein the plurality of second heat transfer surfaces comprise a plurality of tubes filled with the phase change material,
wherein each tube in the plurality of tubes comprise an inner tube running therethrough, and wherein the plurality of the inner tubes comprise the plurality of first heat transfer surfaces, and
wherein the thermal energy cooling system is configured to continue circulating the first refrigerant or heat transfer fluid at a higher temperature than the first temperature after the crystallization of the phase change material is initiated to freeze the phase change material.

* * * * *